United States Patent
Yao et al.

(10) Patent No.: US 7,295,905 B2
(45) Date of Patent: Nov. 13, 2007

(54) CONTROL OF A STEERING WHEEL SYSTEM WITH PASSIVE RESISTANCE TORQUE

(75) Inventors: Yixin Yao, Ann Arbor, MI (US); Brian E. Daugherty, Ann Arbor, MI (US)

(73) Assignee: Visteon Global Technology, Inc., Van Buren Township, MI (US)

(*) Notice: Subject to any disclaimer, the term of this patent is extended or adjusted under 35 U.S.C. 154(b) by 330 days.

(21) Appl. No.: 10/901,521

(22) Filed: Jul. 29, 2004

(65) Prior Publication Data

US 2006/0025911 A1   Feb. 2, 2006

(51) Int. Cl.
  *B62D 11/00*  (2006.01)
  *H02P 7/00*  (2006.01)
  *G06F 17/00*  (2006.01)
(52) U.S. Cl. .............................. 701/41; 701/42; 701/1; 180/443; 318/342
(58) Field of Classification Search ................ 701/41, 701/42, 1; 180/443, 402, 444; 88/267.2; 318/342
See application file for complete search history.

(56) References Cited

U.S. PATENT DOCUMENTS 6,535,806 B2 * 3/2003 Millsap et al. ............... 701/42
6,550,565 B2 * 4/2003 Thomas et al. ............... 180/402
6,687,588 B2 * 2/2004 Demerly et al. .............. 701/41
2002/0035424 A1 * 3/2002 Kaufmann et al. ........... 701/41
2005/0017664 A1 * 1/2005 Takahashi et al. ........... 318/432

FOREIGN PATENT DOCUMENTS

| DE | 19804821 | 8/1998 |
| DE | 19820774 | 11/1999 |
| DE | 10018191 | 10/2000 |
| DE | 10102244 | 3/2002 |

* cited by examiner

*Primary Examiner*—Tan Q. Nguyen
(74) *Attorney, Agent, or Firm*—Brinks Hofer Gilson & Lione

(57) ABSTRACT

A control system and method for a steer-by-wire system with the passive resistance torque is provided. The control system includes a controller configured to compensate for a passive resistance torque and to generate the required active torque using a three loop control structure: torque feedback loop, rate feedback loop, and steering wheel angle feedback loop. The torque feedback loop is based on an estimated steering torque signal calculated from a steering angle signal, a steering angle rate signal, and a motor current signal.

25 Claims, 3 Drawing Sheets

CONTROL OF A STEERING WHEEL SYSTEM WITH PASSIVE RESISTANCE TORQUE

BACKGROUND

1. Field of the Invention

The present invention generally relates to a control system and method for a steer-by-wire system with the passive resistance torque.

2. Description of Related Art

In a steer-by-wire system, the mechanical linkage between the steering wheel and road wheels has been eliminated. The direction handling commands are communicated from the steering wheel to the road wheels using electric signals with no mechanical linkages. The road wheels are actuated using an electric motor-based actuation control system. The steering feel of a conventional mechanically linked steering system is simulated using an electric motor-based steering wheel control system. This electric motor-based steering wheel control system is referred to as the artificial steering feel control system or the steering wheel control system.

In general, the steering wheel control system is composed of an electric motor, a motor amplifier, steering wheel, gears or other coupling devices, the steering shaft and sensors. When the steering wheel control system is powered, a passive resistance torque is produced in the steering wheel. This passive resistance torque is especially high in a steering wheel system with mechanical gears as the coupling device between motor and steering wheel. When the vehicle driver holds and turns the steering wheel, the driver feels a sticky, passive resistance torque from the steering wheel device due to this high passive resistance torque. This passive resistance torque exists in many general motion control systems.

There are two main causes of passive resistance torque: motor back EMF voltage and inertia from the gear ratio. Although, mechanical friction also contributes to the passive resistance torque. The passive resistance torque produced by back EMF and inertia from the gear ratio, is in a direction opposite of the turning direction of the steering wheel.

When vehicle driver turns the steering wheel, a back EMF voltage is generated in the motor circuit. It is known that the back EMF tends to cancel out the applied voltage, so that, the actual voltage across the motor armature is the difference between the applied voltage and the back EMF. This difference causes a current in the armature to flow. The motor current caused by back EMF voltage flows in a direction opposite the motor control current. Thus, the motor torque produced by back EMF is in the opposite direction with the turning direction of the steering wheel.

The reflected inertia of the motor, through a gear ratio of N between the motor and the steering wheel, increases as a function of N squared times the motor inertia $J_m$. With the steering wheel inertia represented as $J_s$, total inertia at the steering wheel due to the influence of the gear ratio N becomes $$J_{Total} = N^2 J_m + J_s \quad (1)$$

The gear ratio N also increases N times the resistance torque $T_{MbackEMF}$ from the motor caused by the back EMF voltage. Resistance torque on the steering wheel is expressed as:

$$T_{SbackEMF} = N T_{MbackEMF} \quad (2)$$

This torque is a sticky, passive resistance that the driver would feel while steering the vehicle. The passive resistance torque is not acceptable in commercial steer-by-wire systems that produce active steering feel.

In view of the above, it is apparent that there exists a need for a control system for a steer-by-wire system to compensate for passive resistance torque and to generate the active steering torque as well as other required steering functions.

SUMMARY

In satisfying the above need, as well as overcoming the enumerated drawbacks and other limitations of the related art, the present invention provides a control system and method for a steer-by-wire system to compensate for passive resistance torque and implement the required steering function. The steering wheel control system includes a controller configured to compensate for a passive resistance torque and generate the required active steering torque using a control system structure with three feedback loops: steering wheel torque feedback loop, steering wheel rate feedback loop, and steering wheel angle feedback loop.

In another aspect of the present invention, the torque feedback loop is based on an estimated steering torque signal calculated from a steering angle signal, a steering angle rate signal, and a motor current signal based on the controlled plant model. Further, the steering angle rate signal may be estimated based on a derivative calculation of the steering wheel angle signal.

In another aspect of the present invention, the steering wheel controlled plant is described and modeled as a closed loop control system. A relation is established among vehicle driver action torque, passive resistance torque, and active steering wheel torque.

In another aspect of the present invention, the control system includes a rate feedback loop based on the steering wheel angle rate.

In another aspect of the present invention, the control system includes a steering angle feedback loop. The steering angle feedback loop being based on a steering wheel angle measurement.

In another aspect of the present invention, the controller is configured to generate a high level of torque to simulate a mechanical end stop when the steering wheel angle is larger than a required stop angle.

In another aspect of the present invention, the controller is configured to prevent an over torque condition by setting a torque saturation level.

Further objects, features and advantages of this invention will become readily apparent to persons skilled in the art after a review of the following description, with reference to the drawings and claims that are appended to and form a part of this specification.

DETAILED DESCRIPTION

Figure 1:
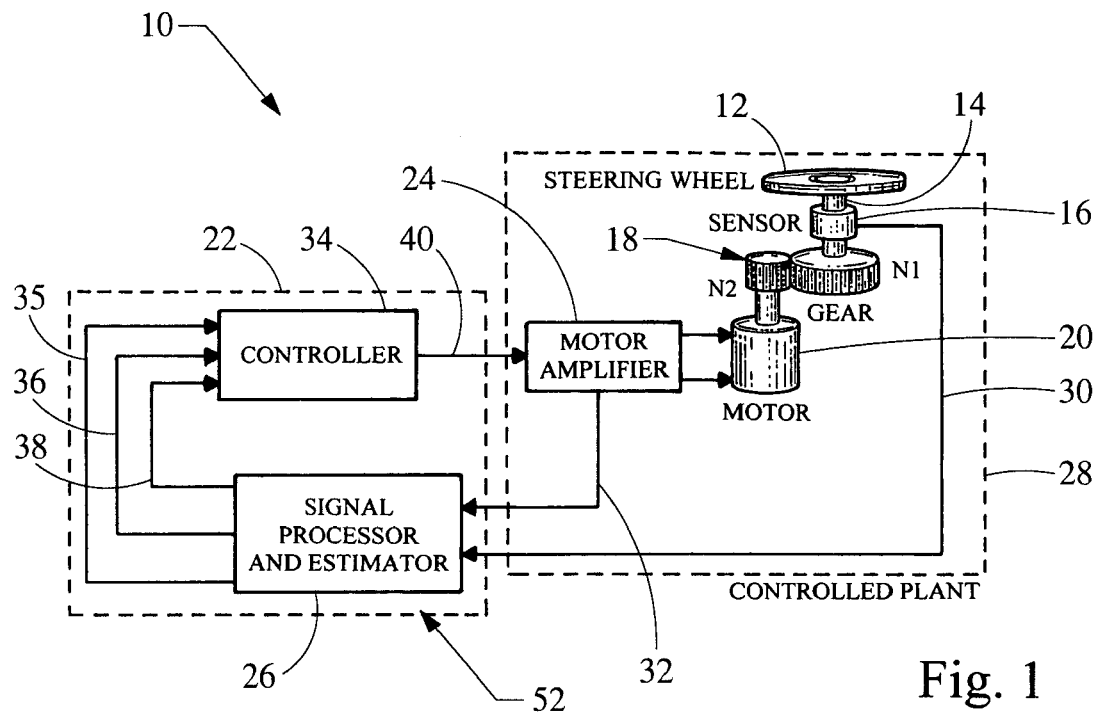
FIG. 1 is a block diagram of a steer-by-wire system in accordance with the present invention.

Referring now to FIG. 1, a steering wheel control system embodying the principles of the present invention is illustrated therein and designated at 10. The steering wheel control system 10 is a feedback control system that includes the controlled plant 28 and the controller 22.

The controlled plant 28 includes a steering mechanism 12, a steering shaft 14, a steering wheel angle sensor 16, a torque transfer mechanism (coupler) 18, a motor 20, and a motor amplifier 24. The steering mechanism 12, such as a steering wheel, is connected to the steering shaft 14. As the driver rotates the steering mechanism 12, the steering shaft 14 rotates with the steering mechanism 12. The sensor 16 is coupled with the steering shaft 14 to create a steering wheel angle signal 30. The motor 20 is coupled to the steering shaft 14 through a torque transfer mechanism 18. The torque transfer mechanism 18 may be a pair of gears, a belt and pulley, or other similar mechanism for transferring torque. The motor 20 provides a feedback torque to the steering mechanism 12, through the torque transfer mechanism 18 and steering shaft 14, to provide an artificial steering feel to the driver. The motor amplifier 24 drives the motor 20 based on the control signal 40 from the steering wheel controller 22. The motor amplifier 24 also provides a motor current signal 32 as a feedback signal to the steering wheel controller 22 for use in generating the control signal 40. The vehicle speed signal 52 is also used as an input signal for the steering wheel controller 22.

The steering wheel controller 22 receives the steering wheel angle 30 and motor current signal 32 from the controlled plant 28. To produce an artificial steering feel and compensate the passive torque in the controlled plant 28, the steering wheel controller 22 generates a control signal 40. In addition, a vehicle speed signal 52 is provided from a vehicle controller.

With respect to the steering wheel controller 22, a signal processor and estimator 26 receives the motor current signal 32 and the steering wheel angle 30. The outputs of signal processor and estimator 26 include a filtered steering wheel angle signal 35, a steering wheel rate signal 36 by the differential calculation from steering wheel angle signal 35, and an estimated steering wheel torque signal 38. These output signals are provided to the feedback loop controller 34. The feedback loop controller 34 calculates the control signal 40 based on the steering wheel angle signal 35, the steering wheel rate signal 36, and the estimated steering wheel torque signal 38.

The steering wheel angle signal 30 is also used to be reference angle signal of a road wheel actuation control system (not shown). The road wheel actuation system can be designed to be a servo feedback control system that manipulates the physical angle of the road wheels.

Figure 2:
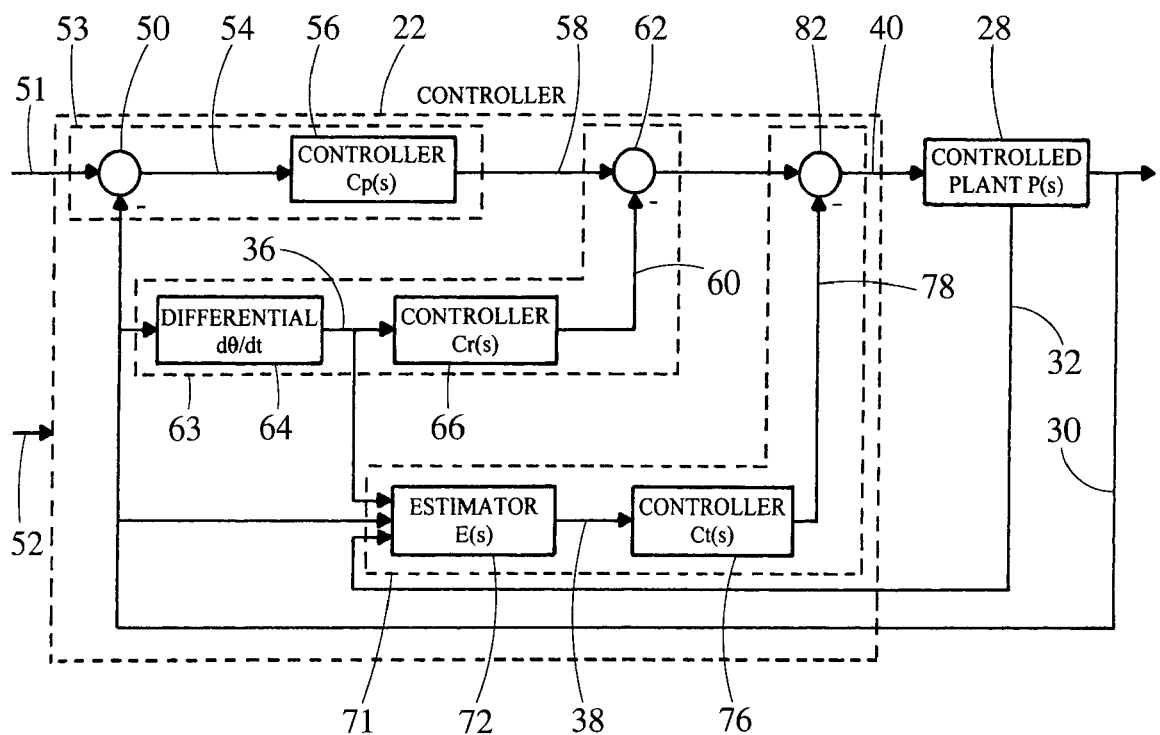
FIG. 2 is a block diagram of the controller in accordance with the present invention.

Now referring to FIG. 2, a schematic block diagram of the steering wheel feedback control system including the steering wheel controller 22 and controlled plant 28 is provided. The steering wheel control system shown in FIG. 2 has three feedback loops: the torque feedback loop 71 with estimator 72 E(s), controller 76 $C_\tau(s)$ and controlled plant 28, the rate feedback loop 63 with the controller 66 $C_r(s)$ and controlled plant 28, and steering wheel angle feedback loop 53 with controller 56 $C_p(s)$ and controlled plant 28. The main function of the three feedback control loops is to compensate the passive torque and generate active torque. Other functions, such as, active steering wheel return, steering wheel end stop and the high active torque prevention can also be implemented by applying this three loop control structure.

The steering wheel controller 22 receives a negatively fed steering wheel angle signal 30 and a steering wheel angle reference signal 51. The steering wheel angle reference signal 51 and the steering wheel angle signal 30 are provided to the summer 50 of the angle feedback loop to generate the angle error signal 54. The angle error signal 54 from the summer 50 is provided to the angle controller 56. The angle controller 56 produces the control signal 58. The control signal 58 is provided to the controlled plant 28 along with the control signal 60 from the rate controller 66 in the summer 62 and control signal 78 from torque controller 76 in the summer 82. As a result, the steering wheel torque in the controlled plant 28 is controlled by the control signal 40. As a part of control signal 40, the function of control signal 58 is to provide the control for the steering wheel torque based on change of the steering wheel angle. The change of the control signal 58 depends on the angle controller 56. The angle controller 56 is a non-linear controller and can be described and implemented using a mathematic equation and/or lookup table. The angle feedback loop including the angle controller 56 is used mainly to produce the adjustable active steering torque and to implement the automatic steering wheel return when the vehicle driver releases the steering wheel. When the vehicle driver turns the steering wheel, the driver will feel the steering wheel torque change. When the driver releases the steering wheel, the steering wheel will return to a predetermined angle corresponding to the road wheel angle and vehicle speed.

The differential processor 64 in the rate feedback loop including the rate controller 66 and controlled plant 28 receives the steering wheel angle signal 30. The differential processor 64 takes the derivative of the steering wheel angle signal 30 to produce the steering wheel rate signal 36. The steering wheel rate signal 36 is provided to the rate controller 66. The rate controller 66 produces the control signal 60. The control signal 60 is provided to the controlled plant 28 along with the control signal 58 from the angle controller 56 and control signal 78 from torque controller 76. As a part of control signal 40, the function of control signal 60 is to provide the control for the steering wheel rate based on a change of the steering wheel rate. The change of the control signal 60 depends on the rate controller 66. The rate controller 66 is a non-linear controller and can be described and implemented using a mathematic equation and/or lookup table. The rate feedback loop including the rate controller 66 is used mainly to produce a suitable damping of the steering wheel and adjustable steering wheel return rate. When a driver of the vehicle releases the steering wheel, the steering wheel will return to a predetermined angle with a variable steering wheel rate determined by an on-line parameter adjustment of the rate controller 66.

The estimator 72 of the torque feedback loop 71 receives the steering wheel rate signal 36, the steering wheel angle signal 30, and the motor current signal 32. Estimators are generally used to determine internal states of a system based on measurements of other states. An estimator is a mathematical structure that combines sensor outputs and plant input signals. In some cases, the estimator can be more accurate than a physical sensor or can reduce the phase lag inherent in monitoring sensor output.

The estimator 72 provides an estimated steering wheel torque signal 38 based on the steering wheel rate signal 36, the steering wheel angle signal 30, and the motor current signal 32. The estimated steering wheel torque signal 38 is provided to the torque controller 76.

The torque controller 76 produces the control signal 78. The control signal 78 is provided to the controlled plant 28 along with the control signal 60 from the rate controller 66 and control signal 58 from angle controller 56 in the summer 62. As a result, the steering wheel torque in the controlled plant 28 is controlled by its input signal 40. As a part of control signal 40, the function of torque control signal 78 is to provide the passive resistance torque compensation based on any change of the estimated torque signal 38. The change of the torque control signal 78 depends on the torque controller 76. The torque controller 76 is a non-linear controller and can be described and implemented using a mathematic equation and/or lookup table. The torque feedback control loop including the torque controller 76 is mainly provided to compensate for the passive resistance torque.

Figure 3:
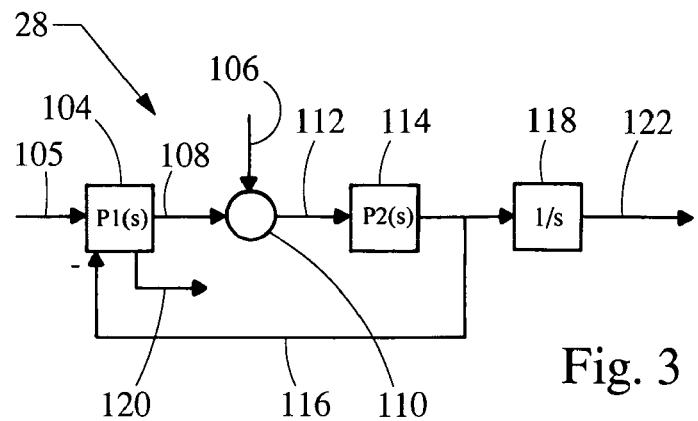
FIG. 3 is a block diagram of the controlled plant.

Referring now to FIG. 3, a block diagram of the controlled plant 28 from FIG. 2 is provided in simplified form. The controlled plant 28 including steering hardware devices can be considered as a closed-loop system. In FIG. 3, block 104 $P_1(s)$ represents the transfer function to generate steering wheel torque 108 $\tau_L$ based on the input signal 105 V and the steering wheel rate 116. The external torque 106 $\tau_d$ represents the driver input torque. It can be considered as an external disturbance in the closed-loop controlled plant. Block 114 $P_2(s)$ represents the transfer function between the effective torque 112 $\tau_e$ and the steering wheel rate 116. The steering wheel rate 116 is provided to block 104 $P_1(s)$ such that a closed-loop is formed. It is noticed that the motor current signal 120 is shown in FIG. 3 as an intermediate variable in the controlled plant 28 P(s). Further, the steering wheel rate 116 is integrated, as denoted by block 118, to provide a steering wheel angle 122.

Consider the input signal 105 V is zero. When driver of the vehicle turns the steering wheel, an external torque 106 $\tau_d$ is produced in the controlled plant 28. Even though the input control signal 105 V is zero, a steering wheel torque 108 $\tau_L$ can be produced through this closed loop system. In this situation, the steering wheel torque 108 $\tau_L$ is a passive resistance torque that is generated by motor back EMF voltage and high inertia from gear ratio as described earlier.

When the input signal 105 V is not zero, the steering wheel torque 108 $\tau_L$ includes both a passive resistance torque $\tau_p$ and active torque $\tau_a$. In order to obtain a fine artificial steering feel, the passive resistance torque $\tau_e$ should be attenuated and the required variable active torque $\tau_a$ should be obtained by control of the input signal 105 V.

According to the above description, the steering wheel torque 108 $\tau_L$ can be stated as:

$$\tau_L = \tau_p + \tau_a \quad (3)$$

where $\tau_p$ represents the passive resistance torque and $\tau_a$ represents the active torque. The steering wheel control provided compensates for passive resistance torque and generates active torque to produce a fine artificial steering feel.

Figure 4:
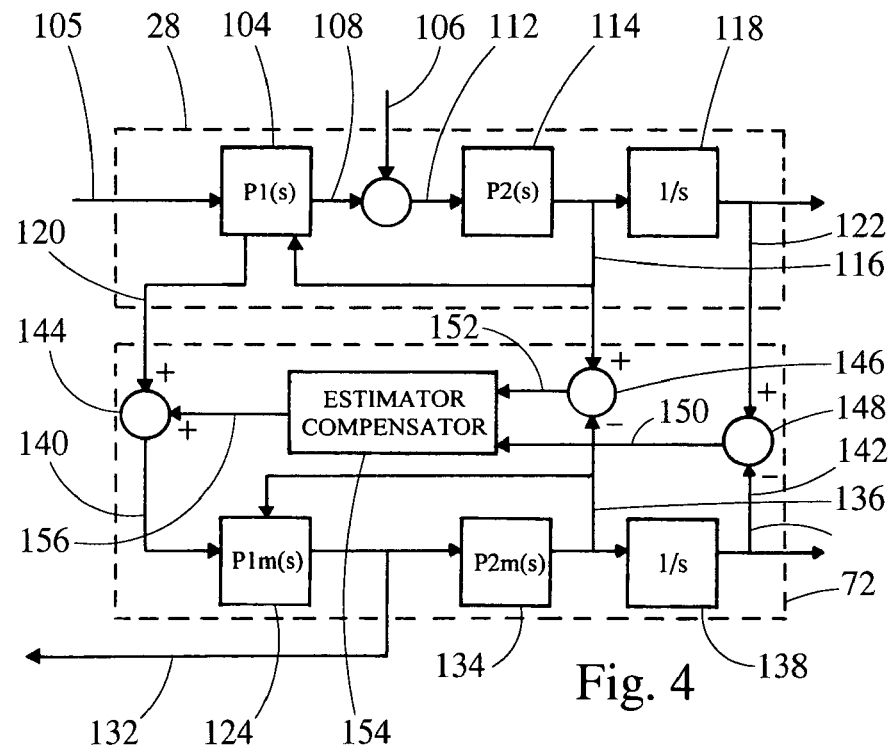
FIG. 4 is a block diagram of the estimator.

Now referring to FIG. 4, a block diagram of the estimator 72 and the controlled plant 28 is provided. The steering wheel angle 122 and steering wheel rate 116 in the output of controlled plant 28 are received by the estimator 72 (the steering wheel rate 116 is calculated from the steering wheel angle). The motor current 120 as an intermediate variable of the controlled plant 28, is also provided to the estimator 72.

The estimator 72 includes a representation of the modeled controlled plant including block 124 $P_{1m}(s)$ and block 134 $P_{2m}(s)$. Block 124 $P_{1m}(s)$ is a transfer function to model the block 104 $P_1(s)$ of the controlled plant 28. More specifically, block 124 $P_{1m}(s)$ represents the relationship between the estimated steering wheel torque 132 and two input signals: the estimated steering wheel rate 136 and the control signal 140 from output of the summer 144. Block 134 $P_{2m}(s)$ is a transfer function to model the block 114 $P_{2m}(s)$ of the controlled plant 28. More specifically, block 134 $P_{2m}(s)$ represents the transfer function between the estimated steering wheel torque 132 and the estimated steering wheel rate 136.

The steering wheel angle 122 and the estimated steering wheel angle 142 are provided to the summer 148 to produce an angle error signal 150. Similarly, the steering wheel rate 116 and the estimated steering wheel rate 136 are provided to summer 146 to generate a rate error signal 152. Both the angle error signal 150 and the rate error signal 152 are provided to the estimator compensator 154. The output 156 from the estimator compensator is provided along with the motor current signal 120 to summer 144 to produce the control signal 140 of the modeled controlled plant. The control signal 140 and the estimated steering wheel rate 136 are provided to block 124 $P_{1m}(s)$ to produce the estimated steering wheel torque 132. The estimated steering wheel torque 132 is provided to block 134 $P_{2m}(s)$ to produce the estimated steering wheel rate 136. The estimated steering wheel rate 136 is integrated to produce an estimated steering wheel angle 142 in block 138. Then, a closed-loop control loop in this estimator is formed. The output 156 from the estimator compensator 154 is configured to reduce the angle error signal 150 and the rate angle signal 152 such that the accurate estimated steering wheel angle 142 and rate 136 are obtained. The parameters of the estimator compensator 154 are designed and adjusted to achieve this goal.

As a result of applying the estimator 72, the estimated steering wheel torque 132 is obtained. This estimated steering wheel torque 132 can be used to be the feedback signal of the torque feedback loop including the torque controller 76 and the controlled plant 28, described in FIG. 2.

Referring again to FIG. 2, the design requirement of the torque controller 76 $C_\tau(s)$ is to make the torque feedback loop 71 to be stale, thereby attenuating the passive resistance torque $\tau_p$. Because the real passive resistance torque $\tau_p$ varies according to the steering wheel rate, the controller 76 $C_\tau(s)$ is a gain scheduling nonlinear controller where the steering rate rate is its scheduling signal. By designing for the controller 76 $C_\tau(s)$ and suitably choosing its parameters, the controller 76 $C_\tau(s)$ can effectively compensate the passive resistance torque $\tau_p$ in the Equation (3).

Referring again to FIG. 2, the steering wheel angle controller 56 $C_p(s)$ is used to generate the required active torque based on the change of the steering wheel angle and related signals. The parameters of angle controller 56 $C_p(s)$ can be adjusted to obtain the required active torque $\tau_a$ without the influence of the passive torque $\tau_p$ expressed in the Equation (1). The input signal of the angle controller 56 $C_p(s)$ is the error $e = \theta_{ref} - \theta$ between the steering wheel angle signal 30 and the steering wheel angle reference signal 51. The output control signal 58 $u_r = C_p e$ changes according to variable active torque requirement. The design of the angle controller 56 $C_p(s)$ should consider loop stability, the influence of the passive torque, and requirement of variable active torque.

The active torque change provides adjustable variable steering feel for the vehicle driver. The active torque, $\tau_a$, is obtained by changing the gain of angle controller 56 $C_p(s)$. The gain change is also based on the vehicle speed signal 52. Thus, the angle controller 56 is a gain scheduling nonlinear controller.

The rate controller 66 $C_r(s)$ of the steering wheel rate loop shown in FIG. 2 is designed to provide the damping control.

It assists the angle controller 56 $C_p(s)$ to improve the steering feel, response time and return rate of steering wheel by generating variable damping the steering wheel control system. The parameters of rate controller 66 $C_r(s)$ changes based on the vehicle speed signal 52. Thus, it is also a gain scheduling nonlinear controller.

Figure 5:
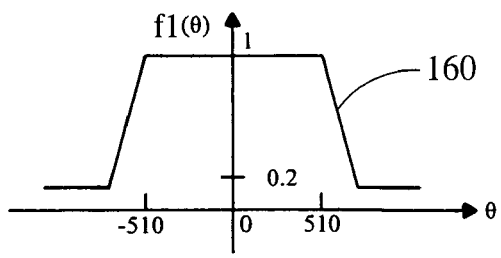
FIG. 5 is a graph depicting the non-linear function of the end stop control.

An end stop function is also provided by the steering wheel control system. The end stop function produces a high amount of torque in the steering wheel, such that the vehicle driver cannot move the steering wheel as required stop angles are reached. The end stop function simulates the mechanical end stop in a conventional steering wheel system. Because the gear motor based steering wheel system can generate a high amount of torque, the steering wheel system control is used to generate a high amount of torque when the steering wheel angle is larger the required stop angle $\pm\theta_{stop}$. The end stop control can also be implemented in other similar torque transfer mechanisms between the motor 20 and the steering wheel 14 shown in FIG. 1. A graph illustrating a function curve 160 for accomplishing the end stop function is provided in FIG. 5. This end stop function is implemented using the torque controller 76 $C_\tau(s)$ of the torque feedback loop in FIG. 2. As shown in FIG. 5, the output value $f_1(\theta)$ change with the input steering wheel angle θ. When the steering wheel angle is less than the end stop angle $\pm\theta_{stop}$ (±510 in this example), the output value $f_1(\theta)$ keeps in the maximum constant value without affect to the nominal control output of the torque controller 76 $C_\tau(s)$. When the steering wheel angle is larger than the end stop angle $\pm\theta_{stop}$, the output value $f_1(\theta)$ is reduced with the curve 160 such that the steering wheel torque is increased by controlling the output of torque controller 76 $C_\tau(s)$.

Since the steering system can generate such a high amount of active torque, it is also possible to produce too much torque for the vehicle driver. An over torque prevention function limits the amount of torque generated when driver turns the steering wheel in the nominal steering wheel angle range, for example −510 to 510 degrees. This over torque prevention function is implemented by using controller 76 $C_\tau(s)$ in the torque feedback loop by setting the torque saturation on the output control signal of the torque controller 76 $C_\tau(s)$ when operating in the nominal steering wheel angle range. A graph illustrating a curve 160 for accomplishing the over torque prevention function within the nominal operating range is provided in FIG. 5. When the steering wheel angle is within the nominal operating range (less than ±510), the output control signal of controller 76 $C_\tau(s)$ is limited in the range $f_1(\theta)$ less than 1 representing 5 (Nm). In the other word, any steering wheel torque that is higher than 5 (Nm) in the nominal steering wheel operating range ±510 will be limited in 5 (Nm) to avoid the high torque.

Figure 6:
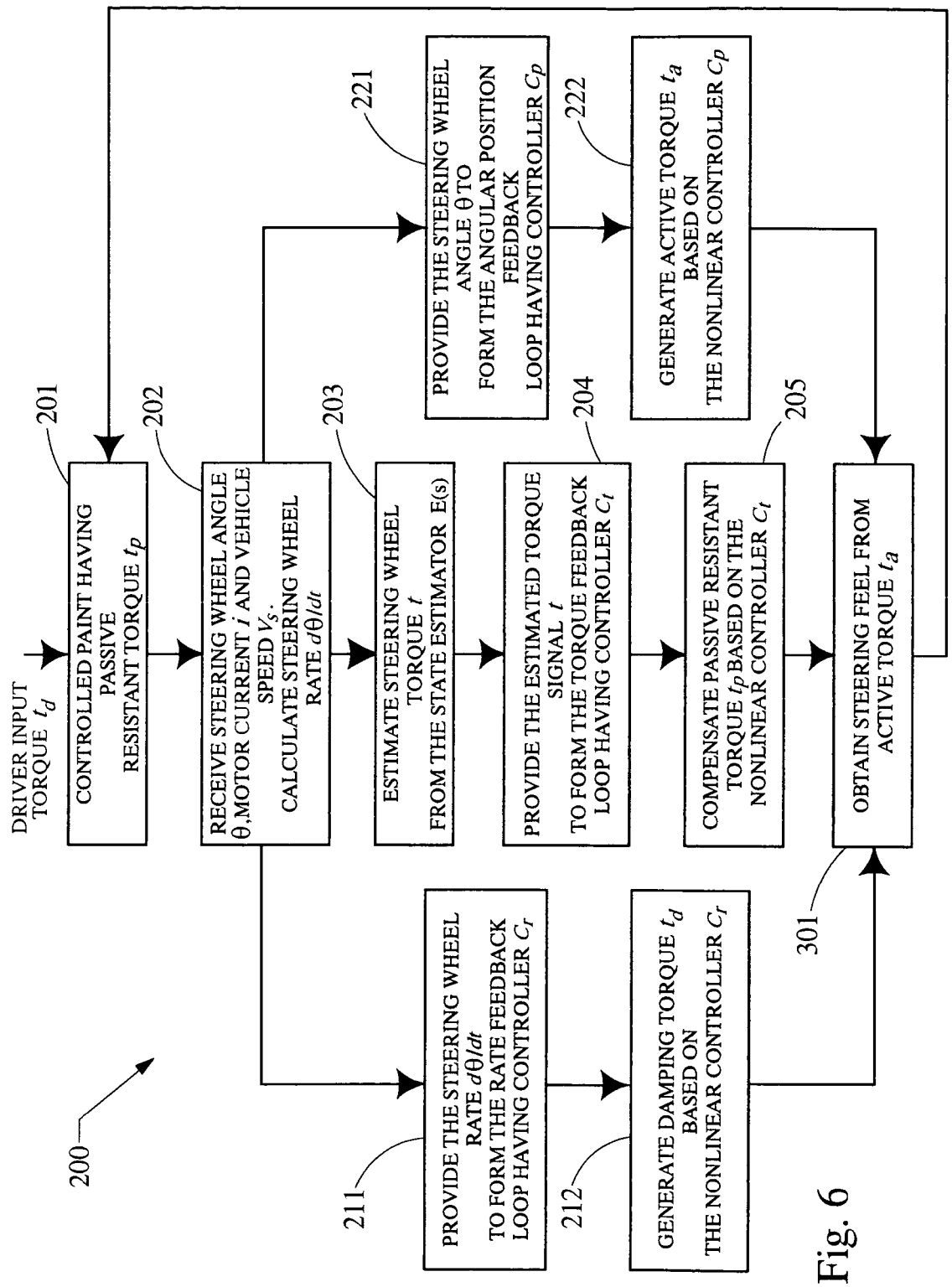
FIG. 6 is a flow chart illustrating a method of controlling a steer-by-wire system in accordance with the present invention.

Referring now to FIG. 6, a process 200 is shown that depicts a general procedure performed during the operation of the steering wheel control of the steer-by-wire system. The process 200 initializes in step 201. The external torque $\tau_d$ from drive of vehicle is given to the steering wheel and controlled plant having the passive resistance torque $\tau_p$. The measurement signals from the controlled plant and vehicle are received in step 202. These signals include the steering wheel angle, motor current, vehicle speed signals and calculated steering wheel rate from steering wheel angle.

In step 203 the estimated steering torque signal is generated from the state estimator E(s) based on the measurement signals in step 202. The estimated steering wheel torque signal is fed to the torque controller $C_\tau(s)$ to form the torque feedback loop with the controlled plant in step 204. The torque controller $C_\tau(s)$ is designed to compensate the passive resistance torque in the controlled plant, as denoted by step 205.

Accordingly, the steering rate signal from step 202 is fed to the rate controller $C_r(s)$ to form the rate feedback loop with the controlled plant in step 211. The rate controller $C_r(s)$ is designed to generate damping torque to improve the steering wheel torque and steering wheel return rate in step 212.

The steering wheel angle signal from step 202 is fed to the angle controller $C_p(s)$ to form the steering wheel angle feedback loop with the controlled plant in step 221. The angle controller $C_p(s)$ is designed to generate active torque $\tau_a$ according to the steering wheel angle change as denoted by step 222. In step 301, the output of steps 205, 212, and 222 are combined to obtain steering feel from the active torque. The active torque from step 301 causes a physical feedback to the controlled plant in step 201 and the process to produce torque for steering feel is reiterated.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A control system for a steer-by-wire system, the steer-by-wire system having a motor to produce a feedback torque on a steering mechanism, the control system comprising:
   a controller configured to compensate for a passive torque of the motor using a torque feedback loop, wherein the torque feedback loop includes a torque estimator that generates an estimated steering torque signal based on the steering wheel angle;
   wherein the estimated steering torque is based on a steering angle signal, a steering angle rate signal, and a motor current signal.

2. The control system according to claim 1, wherein the steering angle rate signal is calculated based on a steering wheel angle signal.

3. The control system according to claim 2, wherein the steering wheel angle rate signal is calculated based on the derivative of the steering wheel angle signal.

4. A control system for a steer-by-wire system, the steer-by-wire system having a motor to produce a feedback torque on a steering mechanism, the control system comprising:
   a controller configured to compensate for a passive torque of the motor using a torque feedback loop and a rate feedback loop, wherein the torque feedback loop includes a torque estimator that generates an estimated steering torque signal based on the steering wheel angle.

5. The control system according to claim 4, wherein the rate feedback loop is based on a steering wheel angle rate.

6. The control system according to claim 5, wherein the steering wheel angle rate is calculated based on the steering wheel angle.

7. A control system for a steer-by-wire system, the steer-by-wire system having a motor to produce a feedback torque on a steering mechanism, the control system comprising:
   a controller configured to compensate for a passive torque of the motor using a torque feedback loop and a steering angle feedback loop, wherein the torque feedback loop includes a torque estimator that generates an estimated steering torque signal based on the steering wheel angle.

8. The control system according to claim 7, wherein the steering angle feedback loop is based on a steering wheel angle and a steering wheel reference angle.

9. A control system for a steer-by-wire system, the steer-by-wire system having a motor to produce a feedback torque on a steering mechanism, the control system comprising:
a controller configured to compensate for a passive torque of the motor using a torque feedback loop, wherein the controller is configured to generate a high torque to simulate a mechanical end stop when the steering wheel angle is larger than $\pm\theta_{stop}$, the required stop angle.

10. A control system for a steer-by-wire system, the steer-by-wire system having a motor to produce a feedback torque on a steering mechanism, the control system comprising:
a controller configured to compensate for a passive torque of the motor using a torque feedback loop, wherein the torque feedback loop includes a torque estimator that generates an estimated steering torque signal based on the steering wheel angle;
wherein the controller is configured to prevent an over torque condition by setting a torque saturation level.

11. A control system for a steer-by-wire system, the steer-by-wire system having a motor to produce a feedback torque on a steering mechanism, the control system comprising:
a controller configured to compensate for a passive torque of the motor using a torque feedback loop, wherein the controller provides a control signal to control a steering wheel torque $\tau_L$, including both a passive resistance torque $\tau_t$ and active torque $\tau_a$, and the relation of the passive resistance torque $\tau_p$, the active torque $\tau_a$, and the steering wheel torque $\tau_L$, is given as $$\tau_L = \tau_p + \tau_a.$$

12. A control system for a steer-by-wire system, the steer-by-wire system having a motor to produce a feedback torque on a steering mechanism, the control system comprising:
a controller configured to compensate for passive torque and generate active torque, the controller including a torque feedback loop, a rate feedback loop, and a steering angle feedback loop.

13. The control system according to claim 12, wherein the torque feedback loop is based on an estimated steering torque signal.

14. The control system according to claim 13, wherein the estimated steering torque is based on a steering angle signal, a steering angle rate signal, and a motor current signal.

15. The control system according to claim 14, wherein the steering angle rate signal is calculated based on a steering wheel angle signal.

16. The control system according to claim 15, wherein the steering wheel angle rate signal is calculated based on the derivative of the steering wheel angle signal.

17. The control system according to claim 12, wherein the rate feedback loop is based on a steering wheel angle rate.

18. The control system according to claim 17, wherein the steering wheel angle rate is calculated based on the steering wheel angle.

19. The control system according to claim 12, wherein the steering angle feedback loop is based on a steering wheel angle and a steering wheel reference angle.

20. The control system according to claim 12, wherein the controller is configured to generate a high torque to simulate a mechanical end stop when the steering wheel angle is larger than $\pm\theta_{stop}$, the required stop angle.

21. The control system according to claim 12, wherein the controller is configured to prevent an over torque condition by setting a torque saturation level.

22. The control system according to claim 12, wherein the controller provides a control signal to control a steering wheel torque $\tau_L$ including both a passive resistance torque $\tau_t$ and active torque $\tau_a$, and the relation of the passive resistance torque $\tau_p$, the active torque $\tau_a$, and the steering wheel torque $\tau_L$ is given as $$\tau_L = \tau_p + \tau_a.$$

23. A method for producing a feedback torque for a steer-by-wire system, the method comprising:
receiving a steering wheel angle;
receiving a motor current;
receiving a vehicle speed;
calculating a steering wheel rate;
estimating a steering wheel torque based on the steering wheel angle, a steering wheel angle rate, and a current signal;
providing a torque feedback loop;
compensating for passive resistance torque; and
generating an active feedback torque.

24. The method according to claim 23, further comprising:
providing a rate feedback loop using a steering wheel rate to generate a damping torque.

25. The method according to claim 24, further comprising:
providing a angular position feedback loop using a steering wheel angle to generate an active feedback torque.

* * * * *

UNITED STATES PATENT AND TRADEMARK OFFICE
CERTIFICATE OF CORRECTION

| | | |
|---|---|---|
| PATENT NO. | : 7,295,905 B2 | Page 1 of 1 |
| APPLICATION NO. | : 10/901521 | |
| DATED | : November 13, 2007 | |
| INVENTOR(S) | : Yixin Yao et al. | |

It is certified that error appears in the above-identified patent and that said Letters Patent is hereby corrected as shown below:

In the Claims

Column 9, in claim 11, line 9, after "torque" delete "$\tau_t$" and substitute --$\tau_p$-- in its place.

Column 10, in claim 22, line 3, after "passive resistance torque" delete "$\tau_t$" and substitute --$\tau_p$-- in its place.

Column 10, in claim 25, line 3, after "providing" delete "a" and substitute --an-- in its place.

Signed and Sealed this

First Day of April, 2008

JON W. DUDAS
*Director of the United States Patent and Trademark Office*